US012613660B2

(12) United States Patent
Wang et al.

(10) Patent No.: US 12,613,660 B2
(45) Date of Patent: Apr. 28, 2026

(54) HOSTS, MEMORY SYSTEMS, METHODS OF OPERATING THEREOF, ELECTRONIC APPARATUSES AND COMPUTER-READABLE STORAGE MEDIUMS

(71) Applicant: YANGTZE MEMORY TECHNOLOGIES CO., LTD., Wuhan (CN)

(72) Inventors: Tianyi Wang, Wuhan (CN); Mo Cheng, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/781,565

(22) Filed: Jul. 23, 2024

(65) Prior Publication Data

US 2025/0306802 A1 Oct. 2, 2025

(30) Foreign Application Priority Data

Mar. 29, 2024 (CN) .......................... 202410381717.9

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

2020/0104074 A1* 4/2020 Brown .................. G06F 3/0653
2024/0126462 A1* 4/2024 Kim ...................... G06F 3/0652

* cited by examiner

*Primary Examiner* — Daniel D Tsui

(74) *Attorney, Agent, or Firm* — Conley Rose, P.C.

(57) ABSTRACT

A host is coupled with a memory system supporting a flexible data placement function. The memory system includes a memory device including K dies. The K dies are divided into L reclaim groups, and each reclaim group includes at least one die. K and L are positive integers greater than or equal to 2. The host includes a user layer and a scheduler. The user layer is configured to send N write requests each corresponding reclaim group information. N is a positive integer. The scheduler is configured to receive the N write requests, and place the N write requests in M request sets. Write requests carrying the same reclaim group information are placed in different ones of the request sets. M is a positive integer less than or equal to N.

18 Claims, 8 Drawing Sheets

RECEIVE N WRITE REQUESTS, WHEREIN EACH WRITE REQUEST CARRIES CORRESPONDING RECLAIM GROUP INFORMATION, AND N IS A POSITIVE INTEGER — S1

PLACE THE N WRITE REQUESTS IN M REQUEST SETS, WHERE WRITE REQUESTS CARRYING THE SAME RECLAIM GROUP INFORMATION ARE PLACED IN DIFFERENT ONES OF THE REQUEST SETS, AND M IS A POSITIVE INTEGER LESS THAN OR EQUAL TO N — S2

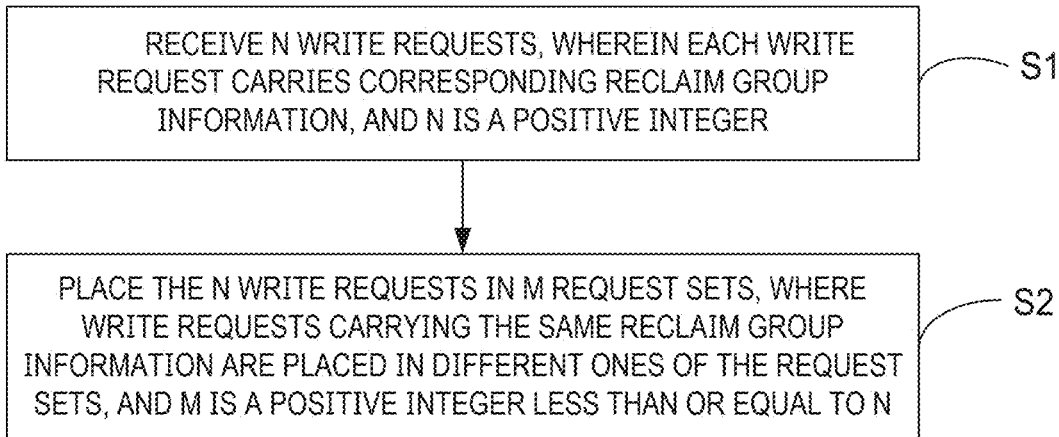

RECEIVE N WRITE REQUESTS, WHEREIN EACH WRITE REQUEST CARRIES CORRESPONDING RECLAIM GROUP INFORMATION, AND N IS A POSITIVE INTEGER — S1

PLACE THE N WRITE REQUESTS IN M REQUEST SETS, WHERE WRITE REQUESTS CARRYING THE SAME RECLAIM GROUP INFORMATION ARE PLACED IN DIFFERENT ONES OF THE REQUEST SETS, AND M IS A POSITIVE INTEGER LESS THAN OR EQUAL TO N — S2

FIG. 7

RECEIVE M WRITE COMMANDS, WHERE EACH OF THE M WRITE COMMANDS CORRESPONDS TO ONE REQUEST SET, EACH REQUEST SET COMPRISES AT LEAST ONE WRITE REQUEST, AND WRITE REQUESTS CARRYING SAME RECLAIM GROUP INFORMATION ARE COMPRISED IN A DIFFERENT REQUEST SET; AND M IS A POSITIVE INTEGER — S3

HOSTS, MEMORY SYSTEMS, METHODS OF OPERATING THEREOF, ELECTRONIC APPARATUSES AND COMPUTER-READABLE STORAGE MEDIUMS

CROSS-REFERENCE TO RELATED APPLICATIONS

The present application claims the benefit of priority to China Application No. 202410381717.9, filed on Mar. 29, 2024, the content of which is incorporated herein by reference in its entirety.

TECHNICAL FIELD

Examples of the present disclosure relate to semiconductor technology, and relate to, but are not limited to, hosts, memory systems, methods of operating thereof, electronic apparatuses, and a computer-readable storage mediums.

BACKGROUND

As data memory technologies develop by leaps and bounds, more and more data memory systems are present in electronic apparatuses used by people, e.g., Solid State Drives (SSDs), etc. Because of characteristics such as fast read and write speeds, vibration resistance, low power consumption, noiselessness, low heat, and light weight, etc., the SSDs have been widely applied in military, vehicle, industry, medical and aviation fields, etc.

SUMMARY

Examples of the present disclosure provide hosts, memory systems, methods of operating thereof, electronic apparatuses and computer-readable storage mediums.

In a first aspect, examples of the present disclosure provide a host. The host is coupled with a memory system supporting a flexible data placement function; the memory system includes a memory device, and the memory device includes K dies; the K dies are divided into L reclaim groups, and each reclaim group includes at least one die; K and L are positive integers greater than or equal to 2; and the host includes a user layer and a scheduler. The user layer is configured to send N write requests, where each write request carries corresponding reclaim group information, and N is a positive integer; and the scheduler is configured to receive the N write requests, and place the N write requests in M request sets, where write requests carrying the same reclaim group information are placed in different ones of the request sets, and M is a positive integer less than or equal to N.

In a second aspect, examples of the present disclosure provide an operation method of a host. The host is coupled with a memory system supporting a flexible data placement function; the memory system includes a memory device, and the memory device includes K dies; the K dies are divided into L reclaim groups, and each reclaim group includes at least one die; and K and L are positive integers greater than or equal to 2. The method includes: receiving N write requests, where each write request carries corresponding reclaim group information, and N is a positive integer; and placing the N write requests in M request sets, where write requests carrying the same reclaim group information are placed in different ones of the request sets, and M is a positive integer less than or equal to N.

In a third aspect, examples of the present disclosure provide a memory system. The memory system includes a memory device and a memory controller coupled with the memory device; the memory device includes K dies; the K dies are divided into L reclaim groups, and each reclaim group includes at least one die; and K and L are positive integers greater than or equal to 2. The memory controller is configured to: receive M write commands, where each of the M write commands corresponds to one request set, each request set includes at least one write request, and each write request carrying same reclaim group information is included in a different request set; and M is a positive integer.

In a fourth aspect, examples of the present disclosure provide an operation method of a memory system. The memory system includes a memory device and a memory controller coupled with the memory device; the memory device includes K dies; the K dies are divided into L reclaim groups, and each reclaim group includes at least one die; and K and L are positive integers greater than or equal to 2. The method includes: receiving M write commands, where each of the M write commands corresponds to one request set, each request set includes at least one write request, and each write request carrying same reclaim group information is included in a different request set; and M is a positive integer.

In a fifth aspect, examples of the present disclosure provide an electronic apparatus. The electronic apparatus includes a host and a memory system coupled with the host, where the memory system includes a memory device and a memory controller coupled with the memory device; the memory device includes K dies; the K dies are divided into L reclaim groups, and each reclaim group includes at least one die; and K and L are positive integers greater than or equal to 2. The host includes a user layer, a scheduler, and a driver layer. The user layer is configured to receive N write requests, where each write request carries corresponding reclaim group information, and N is a positive integer. The scheduler is configured to place the N write requests in M request sets, where write requests carrying the same reclaim group information are placed in different ones of the request sets, and M is a positive integer less than or equal to N. The driver layer is configured to encapsulate each of the M request sets into a corresponding write command conforming to an interface protocol of the memory system, and send the write command to the memory system to simultaneously perform a write operation on each reclaim group carried in the request set corresponding to the write command. The memory controller is configured to receive the write command.

In a sixth aspect, examples of the present disclosure provide a computer-readable storage medium. The computer-readable storage medium stores instructions. The instructions, when being executed, can implement the method as described in any one of the above examples.

BRIEF DESCRIPTION OF THE DRAWINGS

In the drawings, like reference numerals may describe like components in different views. Like drawing signs with different letter suffixes may represent different examples of like parts. The drawings generally illustrate the various examples discussed herein by way of examples rather than limitation.

FIG. 7 is a schematic flow diagram of a method of operating a host provided by examples of the present disclosure.

FIG. 8 is a schematic flow diagram of a method of operating a memory system provided by examples of the present disclosure.

DETAILED DESCRIPTION

Figure 1A:
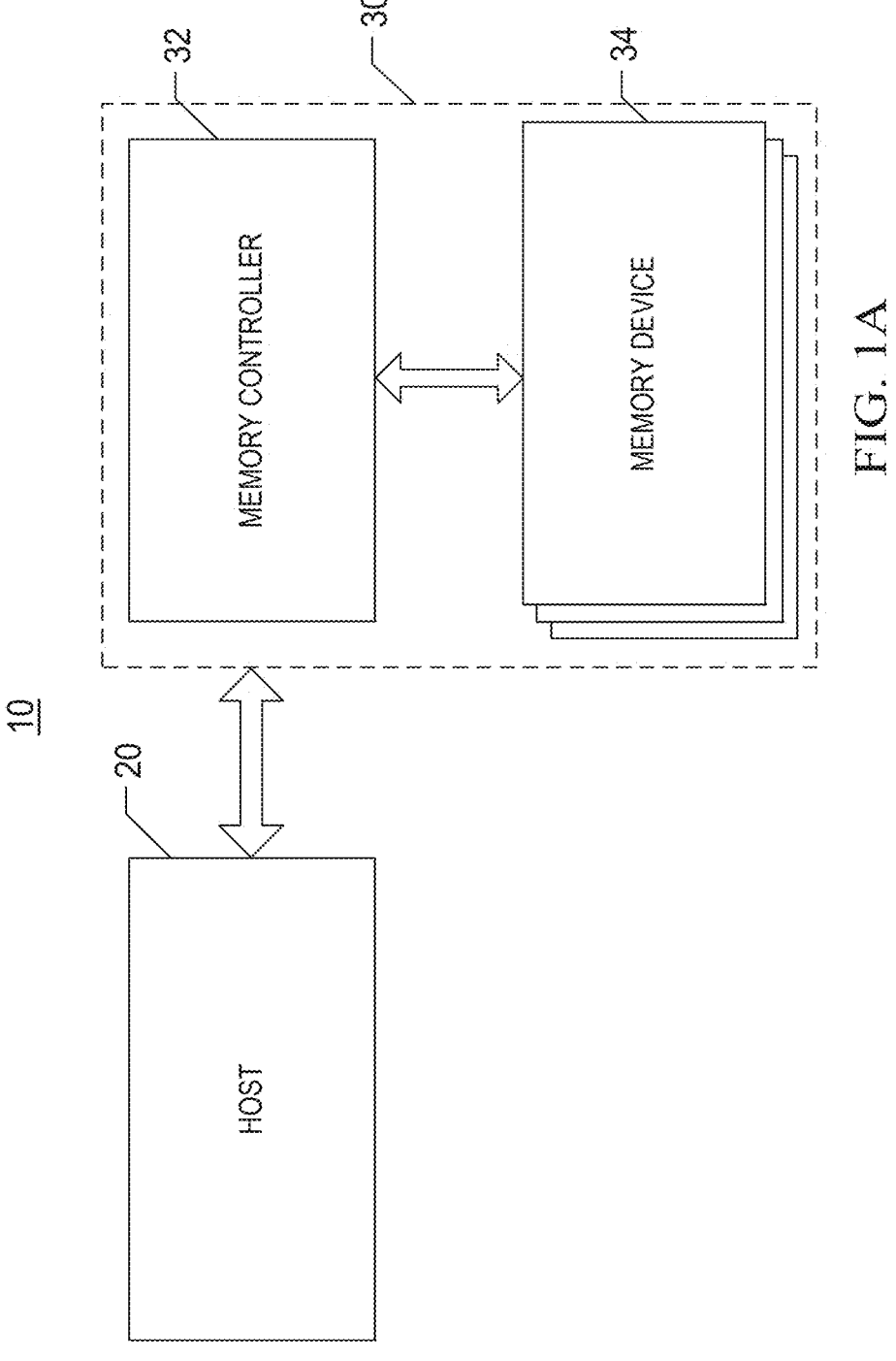
FIG. 1A is a schematic structural diagram of a memory system provided by examples of the present disclosure.

For ease of understanding the present disclosure, the present disclosure will be described in detail below with reference to the related drawings. Preferred examples of the present disclosure are given in the drawings. However, the present disclosure may be implemented in many different forms, and is not limited to the examples described herein. Instead, the purpose of providing these examples is to make the disclosure of the present disclosure more thorough and comprehensive.

Unless otherwise defined, all technical and scientific terms in the specification have the same meaning as those skilled in the art, belonging to the present disclosure, usually understand. The terms used in the specification of the present disclosure are only for the purpose of describing specific examples, and are not intended to limit the present disclosure. The term "and/or" used herein include any and all combinations of one or more listed associated items.

As shown in FIG. 1A, examples of the present disclosure show an example system 10. The example system 10 may include a host 20 and a memory system 30. The example system 10 may include, but is not limited to, a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or a system of any other suitable electronic apparatus having a memory device 34. The host 20 may be a processor of an electronic apparatus (such as a Central Processing Unit (CPU), or a System on Chip (SoC) (such as an Application Processor (AP)).

In an example of the present disclosure, the host 20 may be configured to send or receive data to or from the memory system 30. Here, the memory system 30 may include a memory controller 32 and one or more memory devices 34. The memory device 34 may include, but is not limited to, a NAND Flash Memory, a Vertical NAND Flash Memory, a NOR Flash Memory, a Dynamic Random Access Memory (DRAM), a Ferroelectric Random Access Memory (FRAM), a Magnetoresistive Random Access Memory (MRAM), a Phase Change Random Access Memory (PCRAM), a Resistive Random Access Memory (RRAM), a Nano Random Access Memory (NRAM), etc.

In an example of the present disclosure, the memory controller 32 may be coupled to the memory device 34 and the host 20, and is configured to control the memory device 34. In an example, the memory controller 32 may be designed for operating in a low duty-cycle environment, such as Secure Digital (SD) cards, Compact Flash (CF) cards, Universal Serial Bus (USB) flash drives, or other media for use in electronic apparatuses, such as personal computers, digital cameras, mobile phones, etc. In some examples, the memory controller 32 may further be designed for operating in a high duty-cycle environment such as SSD or embedded Multi-Media Cards (eMMC), which may be used as data memories for mobile apparatuses, such as smartphones, tablet computers, laptop computers, etc., and enterprise memory arrays.

Further, the memory controller 32 may manage data in the memory device 34, and communicate with the host. The memory controller 32 may be configured to control read, erase and program operations of the memory device 34, may further be configured to manage various functions with respect to data stored or to be stored in the memory device 34, including, but not limited to, bad-block management, garbage collection, logical-to-physical address translation, wear leveling, etc., and may further be configured to process Error Checking and Correction (ECC) with respect to the data read from or written to the memory device 34. Furthermore, the memory controller 32 may further perform any other suitable functions as well, for example, formatting the memory device 34 or communicating with an external apparatus (e.g., the host 20 in FIG. 1A) according to a communication protocol. In an example, the memory controller 32 may communicate with the external host through at least one of various interface protocols, such as a USB protocol, an MMC protocol, a Peripheral Component Interconnect (PCI) protocol, a PCI-Express (PCI-E) protocol, an Advanced Technology Attachment (ATA) protocol, a serial-ATA protocol, a parallel-ATA protocol, a Small Computer System Interface (SCSI) protocol, an Enhanced Small Disk Interface (ESDI) protocol, an Integrated Drive Electronic (IDE) protocol, a Firewire protocol, etc.

Figure 1C:
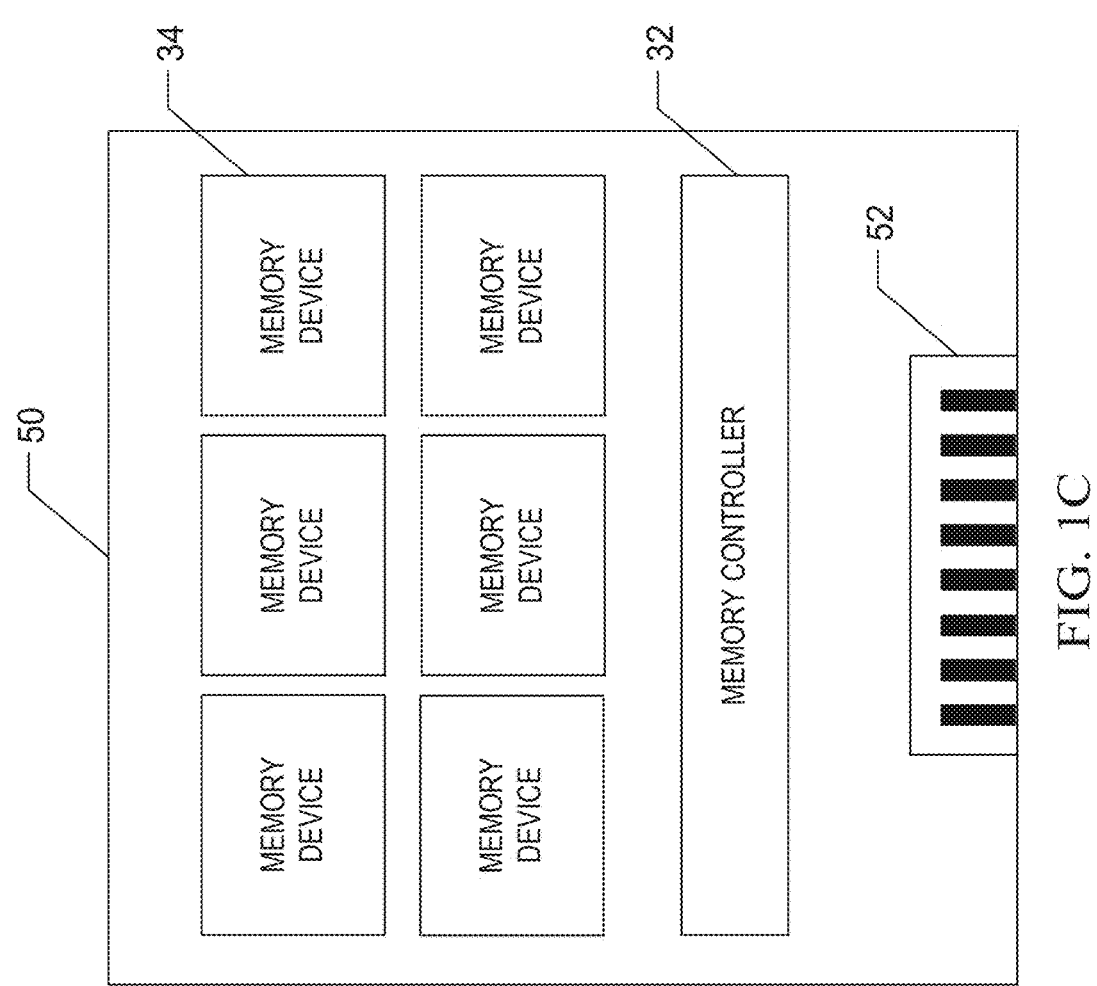
FIG. 1C is a schematic structural diagram of a Solid State Disk (SSD) provided by examples of the present disclosure.
Figure 1B:
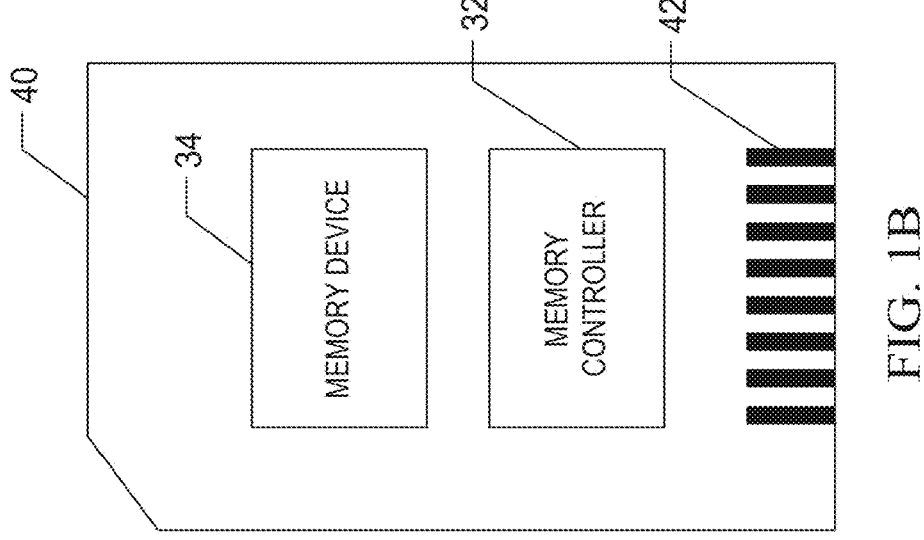
FIG. 1B is a schematic structural diagram of a memory card provided by examples of the present disclosure.

In an example of the present disclosure, the memory controller 32 and the one or more memory devices 34 may be integrated into various types of memory apparatuses, for example, be included in the same package (such as a Universal Flash Storage (UFS) package or an eMMC package). That is to say, the memory system 30 may be implemented and packaged into different types of end electronic products. As shown in FIG. 1B, the memory controller 32 and the single memory device 34 may be integrated together to form a memory card 40. The memory card 40 may include a Personal Computer Memory Card International Association (PC) card, a CF card, a Smart Media (SM) card, a memory stick, a Multi-Media Card (MMC, Reduced-Size MMC (RS-MMC), MMC micro), an SD card (SD, miniSD, microSD, Secure Digital High Capacity (SDHC)), and UFS, etc. The memory card 40 may further include a memory card connector 42 coupling the memory card 40 with a host (e.g., the host 20 in FIG. 1A). In another example shown in FIG. 1C, the memory controller 32 and the plurality of memory devices 34 may be integrated together to form an SSD 50. The SSD 50 may further include an SSD connector 52 coupling the SSD 50 with the host (e.g., the host 20 in FIG. 1A). In some implementations, at least one of a storage capacity or an operation speed of the SSD 50 is greater than at least one of a storage capacity or an operation speed of the memory card 40.

Figure 1D:
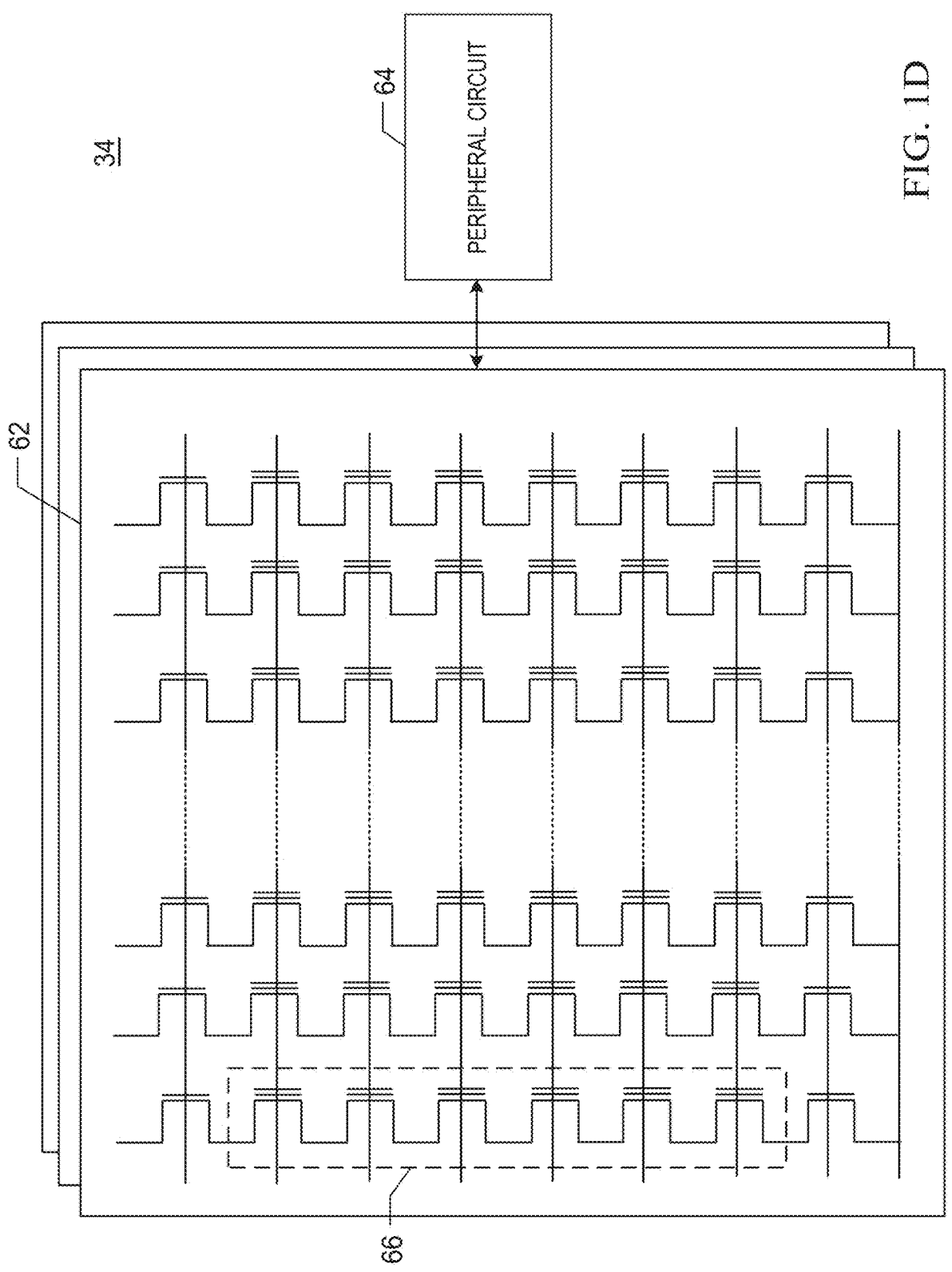
FIG. 1D and FIG. 1E are schematic structural diagrams of a memory device including a memory array and a peripheral circuit provided by examples of the present disclosure.

It is to be noted that, the memory involved in an example of the present disclosure may be a semiconductor memory, which is a solid state electronic device that stores data information and is manufactured by a semiconductor integrated circuit process. In an example, FIG. 1D is a schematic diagram of a memory device 34 in examples of the present disclosure. As shown in FIG. 1D, the memory device 34 may include a memory array 62, a peripheral circuit 64 coupled to the memory array 62, etc. Here, the memory array may be a NAND flash memory array, where a memory cell is provided in the form of an array of NAND memory strings 66, and each NAND memory string 66 vertically extends above a substrate. In some examples, each NAND memory string 66 may include the plurality of memory cells coupled in series and stacked vertically. Each memory cell may maintain a continuous analog value, such as voltage or charge, which depends on the number of electrons trapped within a memory cell region. Furthermore, the memory cell in the above-mentioned memory array 62 may be either a floating gate type memory cell that includes a floating gate transistor, or a charge trapping type memory cell that includes a charge trapping transistor.

In an example of the present disclosure, the above-mentioned memory cell may be a Single Level Cell (SLC) that has two possible memory states and thus may store one bit of data. For example, a first memory state "0" may correspond to a first threshold voltage range, and a second memory state "1" may correspond to a second threshold voltage range. In some other examples, each memory cell may be a Multi Level Cell (MLC) that can store more than one bit of data. For example, the MLC may store two bits per cell. Each memory cell may further be a Triple Level Cell (TLC), or each memory cell may further be a Quad Level Cell (QLC). Each MLC can be programmed to a range of possible nominal storage values. In an example, if each MLC stores two bits of data, the MLC may be programmed such that the memory cell is programmed from an erased state to one of three possible programmed states by writing one of three possible nominal storage values to the memory cell. A fourth nominal storage value may be used to correspond to the erased state.

Figure 1E:
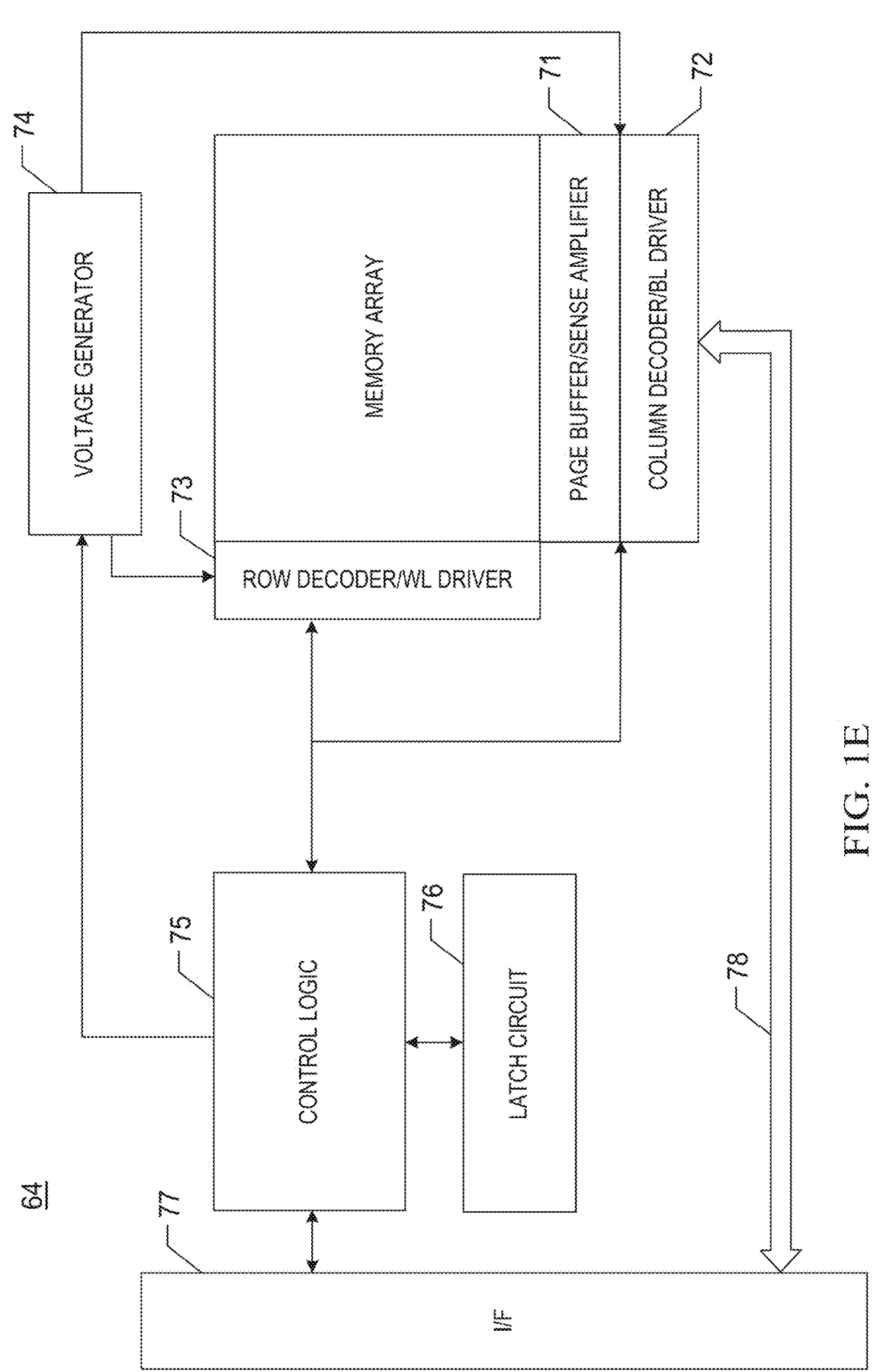

In examples of the present disclosure, the above-mentioned peripheral circuit 64 may be coupled to the memory array through a Bit Line (BL), a Word Line (WL), a source line, a Source Select Gate (SSG), and a Drain Select Gate (DSG). Here, the peripheral circuit 64 may include any suitable analog, digital, and hybrid signal circuits for promoting related operations of the memory array by applying and sensing at least one of voltage signals or current signals to and from each target memory cell via the bit lines, the word lines, the source lines, the SSG, or the DSG, etc. Furthermore, the peripheral circuit 64 may further include various types of peripheral circuits formed using a Metal-Oxide-Semiconductor (MOS) technology. In an example, as shown in FIG. 1E, the peripheral circuit 64 may include a Page Buffer (PB)/sense amplifier 71, a column decoder/bit line driver (BL driver) 72, a row decoder/word line driver (WL driver) 73, a voltage generator 74, a control logic 75, a latch circuit 76, an interface (I/F) 77, and a data bus 78. In some other examples, the peripheral circuit 64 may further include additional peripheral circuits not shown in FIG. 1E.

Figure 2:
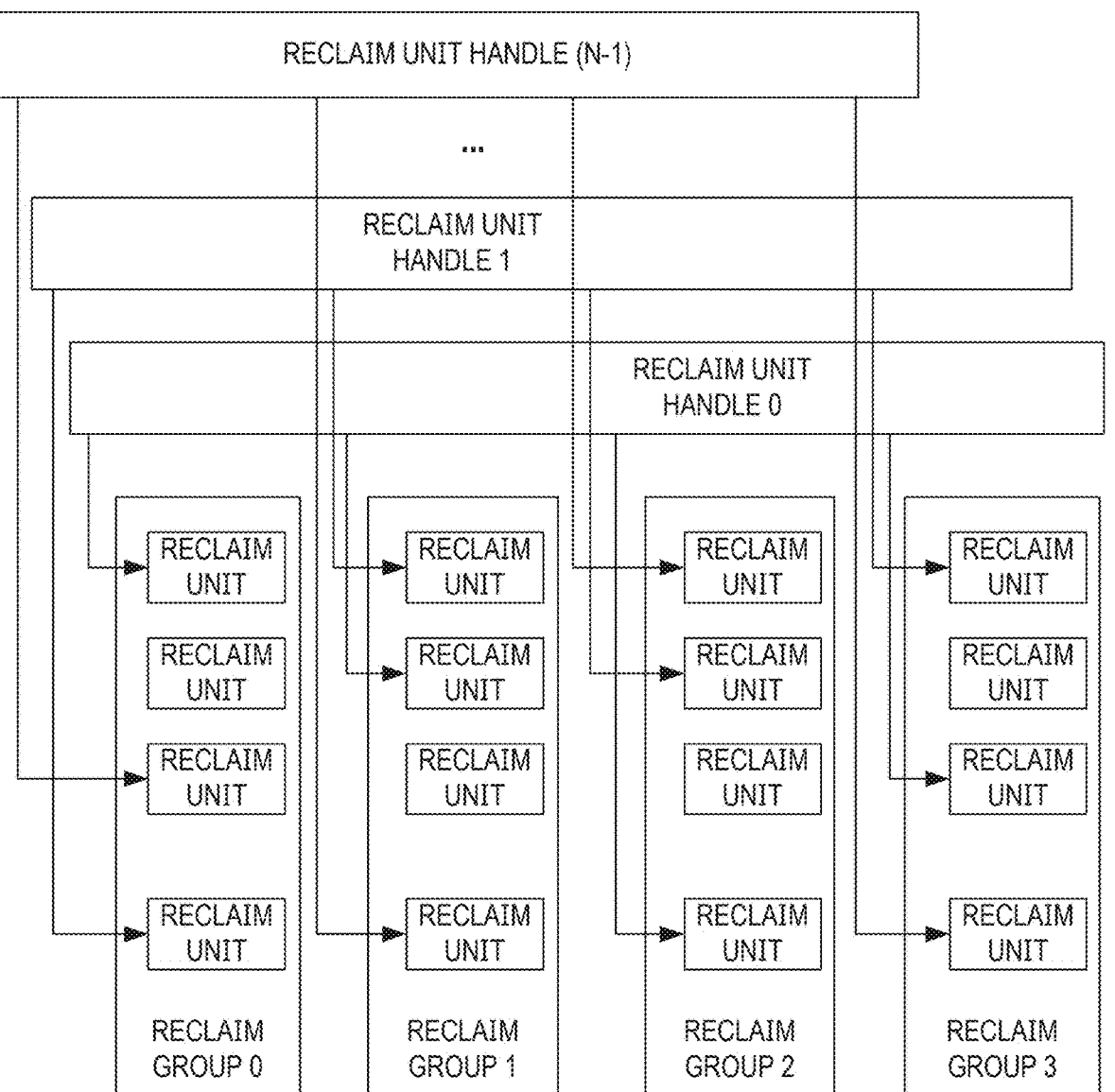
FIG. 2 is a schematic diagram I of a memory system supporting a flexible data placement function.

FIG. 2 is a schematic diagram of a memory system supporting a flexible data placement function. The memory system includes 4 Reclaim Groups (RGs) that are identified as a reclaim group 0 to a reclaim group 3. Each reclaim group may include one or more Reclaim Units (RUs). It can be understood that, the number of the above-mentioned reclaim groups is only an example.

The memory system may receive an I/O command from the host through a communication interface. The I/O command being a write command is used as an example for description below. The write command may include reclaim group information and reclaim unit handle information, and may allow the host to be able to assign the reclaim group and a Reclaim Unit Handle (RUH). When the reclaim group information and the reclaim unit handle information are determined, the reclaim unit pointed to is also determined; and the reclaim unit may be configured to store data related to the write command.

Since the memory system supporting the flexible data placement function exposes underlying logic of an apparatus to the host, the memory system has various advantages, for example, may implement write amplification being 1, and may achieve backward compatibility with traditional applications (APP).

The memory system being an SSD is used an example for description below. It is to be understood that, the memory system of the examples of the present disclosure is not limited thereto.

Figure 3:
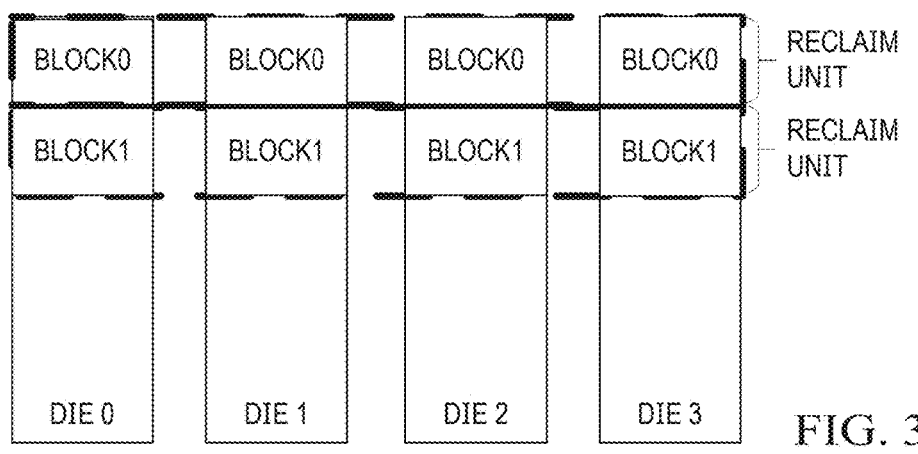
FIG. 3 is a schematic diagram I of configuration for a reclaim group.

In some examples, as shown in FIG. 3, the configuration for the reclaim group may be that, the entire SSD is used as one reclaim group, the SSD includes a plurality of dies, and all the dies are divided into one reclaim group. Each die includes a plurality of blocks. The plurality of blocks are numbered in sequence, for example, numbered from 0. In different dies, the blocks with the same number may constitute one reclaim unit. For example, Block0 of a die 0, Block0 of a die 1, Block0 of a die 2, and Block0 of a die 3 constitute one reclaim unit.

For this example, the reliability of data may be internally controlled by the SSD, and the host fails the controlling of data placement, this is because for the host, it only knows in which reclaim unit the data has been placed, without knowing in which block in the reclaim unit.

Figure 4:
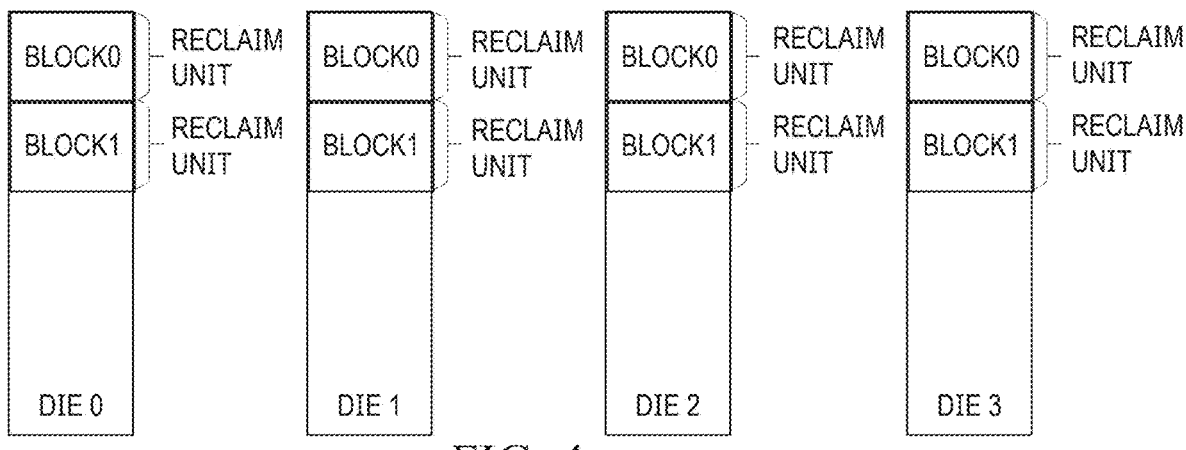
FIG. 4 is a schematic diagram II of configuration for a reclaim group.
Figure 5:
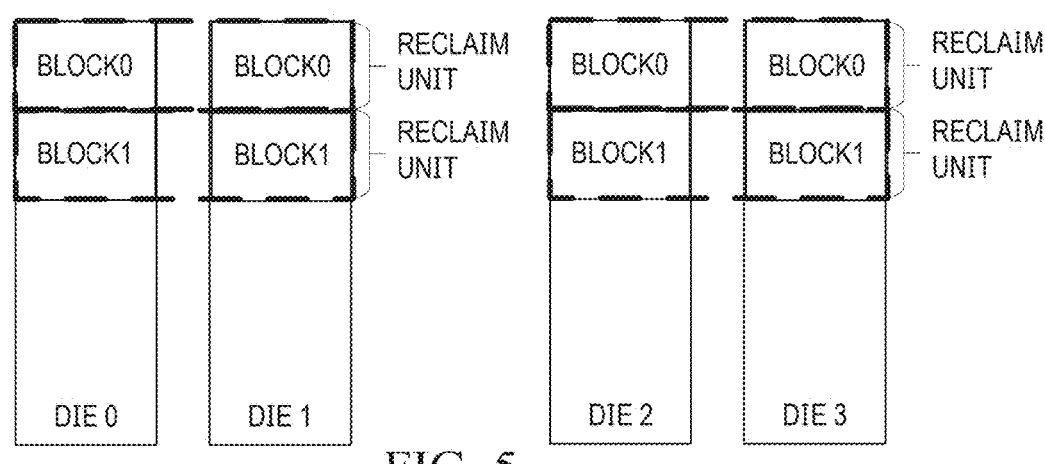
FIG. 5 is a schematic diagram III of configuration for a reclaim group.

In some example, as shown in FIG. 4 and FIG. 5, the configuration for the reclaim group may be that, in the SSD, one or more dies are used as one RG. It is to be noted that, in the solution, the plurality of dies are not equal to all the dies in the SSD. For example, the total number of the dies in the SSD is 4, and one or two dies may be used as one RG.

As shown in FIG. 4, 1 die is used as one RG, and one block in 1 die may be used as one reclaim unit. The Block0 of the die 0 constitutes one reclaim unit, and the Block0 of the die 1 also constitutes one reclaim unit.

As shown in FIG. 5, 2 dies are used as one RG, and the blocks with the same number in two dies may be used as one reclaim unit. Then, the Block0 of the die 0 and the Block0 of the die 1 may constitute one reclaim unit. The Block0 of the die 2 and the Block0 of the die 3 may also constitute one reclaim unit.

In this example, the number of the blocks included in each reclaim unit decreases, and for this example, the host gains more control over data placement.

When the host operates the plurality of APPs at the same time, a plurality of write requests may be generated; the plurality of write requests are encapsulated into the plurality of write commands, and sent to the memory system; these write commands may point to the same die; and when these write commands are performed, die busy is easily caused, i.e., the same die corresponds to the plurality of write requests, causing a degree of parallelism of IO to reduce. For example, the host generates two write requests, and corresponding reclaim group informations carried by these two write requests are the same (e.g., these two write requests carry the same reclaim group information), such that, since a write operation needs to be performed on the same die, die busy is caused.

Figure 6:
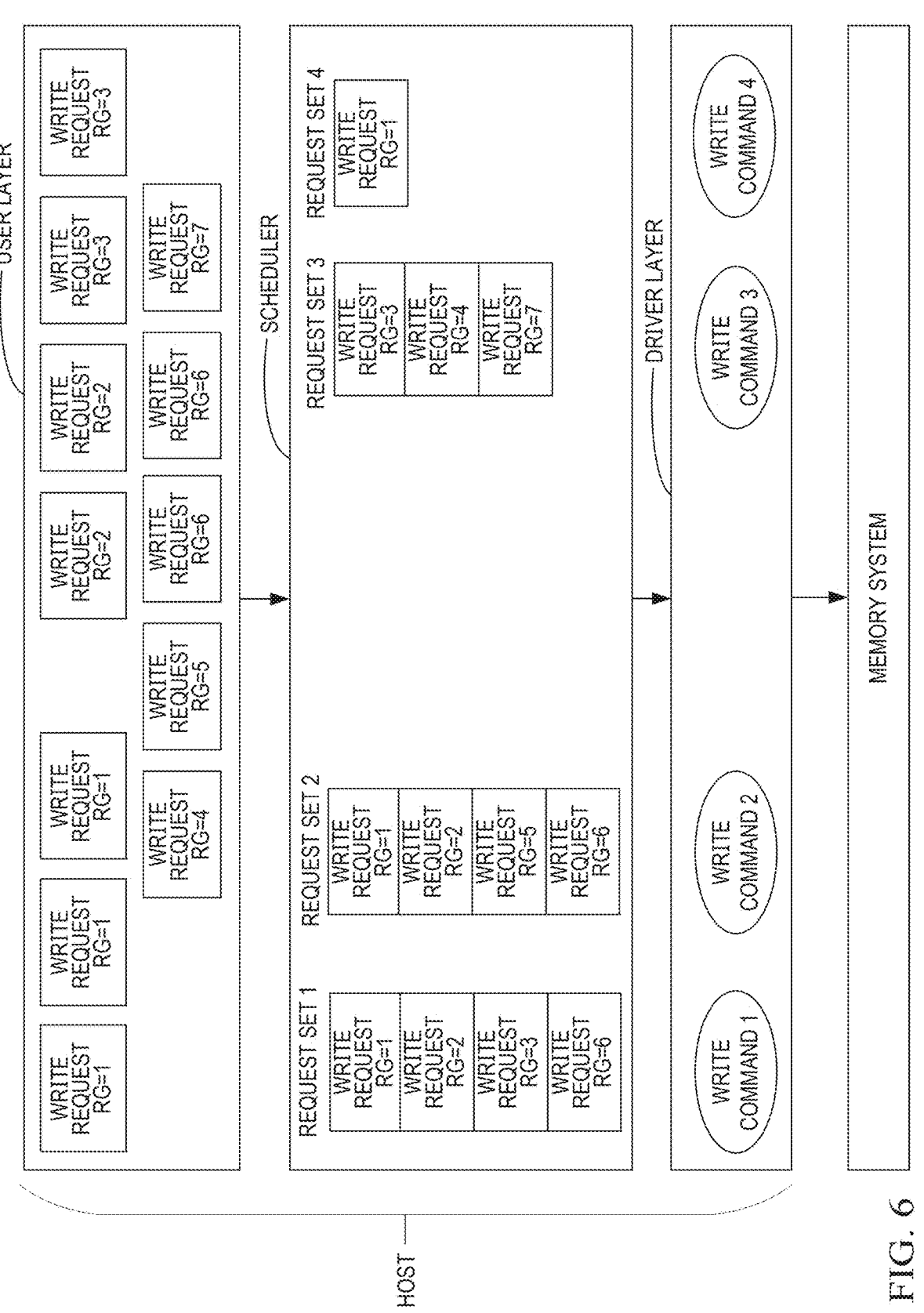
FIG. 6 is a schematic diagram of an electronic apparatus provided by examples of the present disclosure.

In order to solve the above-mentioned problems, as shown in FIG. 6, examples of the present disclosure provide a host. The host is coupled with a memory system supporting a flexible data placement function; the memory system includes a memory device, and the memory device includes K dies; the K dies are divided into L reclaim groups, and each reclaim group includes at least one die; K and L are positive integers greater than or equal to 2; and the host includes a user layer and a scheduler.

The user layer is configured to send N write requests, where each write request carries corresponding reclaim group information, and N is a positive integer.

The scheduler is configured to receive the N write requests, and place the N write requests in M request sets, where write requests carrying the same reclaim group information are placed in different ones of the request sets, and M is a positive integer less than or equal to N.

The host provided by the examples of the present disclosure is coupled with the memory system supporting the flexible data placement function; the write request sent by the host at least carries corresponding reclaim group information; and the reclaim group information is used for indicating in which reclaim group the data related to the write command is written.

It is to be noted that, in the examples of the present disclosure, K dies are divided into at least two reclaim groups, that is to say, one reclaim group do not include all the K dies, this is because, when the reclaim group includes all the dies, and the write request sent by the user layer exceeds one, die busy may be caused.

In the examples of the present disclosure, by adding the scheduler in the host, the scheduling and merging of the write requests from the user layer are realized, the N write requests are placed in the M request sets (M≤N). In some examples, if the reclaim group information correspondingly carried by the N write requests are all the same, the N write requests are placed in the M request sets, and in this case, N is equal to M. In some examples, if at least two pieces of the reclaim group information correspondingly carried by the N write requests are different, the N write requests are placed in the M request sets, and in this case, N is greater than M. It can be understood that, if at least two pieces of the reclaim group information correspondingly carried by the N write requests are different, in the examples of the present disclosure, the effect of improving the degree of parallelism of IO can be achieved by only placing at least two write requests carrying different reclaim group information in one request set. By means of the scheduler provided by the examples of the present disclosure, the write requests from the same reclaim group are prevented from being merged in the same request set, such that the degree of parallelism of IO can be improved.

In the examples of the present disclosure, since reclaim group information correspondingly carried by each write request in the same request set are all different, the plurality of dies required to be occupied by each write request in the same request set are not duplicated as well, thus not causing die busy. The SSD can simultaneously process the plurality of write requests, such that a degree of parallelism of IO is improved, and problems such as performance degradation caused by die busy are avoided.

In conclusion, in the examples of the present disclosure, when one reclaim group does not include all the K dies, the write requests corresponding to the same reclaim group are distributed in different ones of the request sets, and the reclaim group information of each write request in the same request set are all different, such that the control of the host over data can be guaranteed, and the degree of parallelism of IO can be improved.

In some examples, a die includes a plurality of blocks, and the blocks in the reclaim group that are located in a same position of the at least one die constitute a reclaim unit; the memory system is configured with a mapping table, the mapping table is to record a mapping relationship between a reclaim unit handle, the reclaim group and the reclaim unit, and the reclaim unit handle is associated with one reclaim unit in each reclaim group; and each write request also carries corresponding reclaim unit handle information.

In some examples, the write request sent by the host further includes the reclaim unit handle information. That is, the write request includes the reclaim group information and the reclaim unit handle information.

In some examples, each die includes a plurality of blocks. The plurality of blocks in the die are numbered in sequence, for example, numbered from 0. The blocks that have a same number in at least one die, i.e., a same position, may constitute one reclaim unit. As shown in FIG. 4, the Block0 of the die 0 constitutes one reclaim unit, and the Block0 of the die 1 also constitutes one reclaim unit. As shown in FIG. 5, the Block0 of the die 0 and the Block0 of the die 1 may constitute one reclaim unit. The Block0 of the die 2 and the Block0 of the die 3 may also constitute one reclaim unit.

Refer to FIG. 2, the mapping table is to record the mapping relationship between the reclaim unit handle, the reclaim group and the reclaim unit. When the reclaim group information and the reclaim unit handle information are determined, the reclaim unit pointed to is also determined. In some examples, the write request includes the reclaim group information and the reclaim unit handle information, and the corresponding reclaim unit may be found by searching in the mapping table. The reclaim unit may be configured to store data related to the write command.

In the examples of the present disclosure, the data may be flexibly placed at different positions in the memory device through the mapping table, so as to effectively access and process the data.

In some examples, the N write requests constitute at least one request group, and the reclaim group informations carried by write requests in the same request group are the same. In some examples, write requests in the same request group carry the same reclaim group information. M is equal to the number of write requests in the request group with the largest number of write requests among the at least one request group.

The above-mentioned examples are described below by using FIG. 6 as an example.

In FIG. 6, the user layer includes 12 write requests, where there are 3 write requests that carry the reclaim group information being RG=1 and may constitute a request group 1. There are 2 write requests that carry the reclaim group information being RG=2 and may constitute a request group 2. There are 2 write requests that carry the reclaim group information being RG=3 and may constitute a request group 3. There is 1 write request that carries the reclaim group information being RG=4 and may constitute a request group 4. There is 1 write request that carries the reclaim group information being RG=5 and may constitute a request group 5. There are 2 write requests that carry the reclaim group information being RG=6 and may constitute a request group 6. There is 1 write request that carries the reclaim group information being RG=7 and may constitute a request group 7. It can be understood that, the N write requests carry K different pieces of reclaim group information, and the N write requests may constitute K request groups. The number of the request groups is the same as the number of different pieces of reclaim group information.

In some examples, one write request may be selected from each of the request groups and placed in one request set, until the number of the write requests in the request group is 0. In this example, the request set 1=(RG=1, RG=2, RG=3, RG=4, RG=5, RG=6, RG=7), the request set 2=(RG=1, RG=2, RG=3, RG=6), and the request set 3=(RG=1).

For the above-mentioned examples, a situation that the number of constituted request sets is the minimum and the degree of parallelism of IO included in the single request set is the maximum can be realized, such that the time for processing the N write requests can be effectively saved, thereby improving processing efficiency.

In some examples, an absolute value of a difference value between the numbers of write requests included in any two of the M request sets is less than or equal to a preset value.

In some examples, the N write requests can be grouped as evenly as possible, such that the absolute value of the difference value between the numbers of write requests included in any two of the M request sets is less than or equal to the preset value. For example, the preset value may be 1. The 12 write requests shown in FIG. 6 are evenly grouped, in some examples, may be grouped into 3 groups, which are the request set 1=(RG=1, RG=2, RG=3, RG=6), the request set 2=(RG=1, RG=2, RG=5, RG=6), and the request set 3=(RG=1, RG=3, RG=4, RG=7). For this example, a situation that the number of constituted request sets is the minimum and resources occupied by processing each request set each time are almost the same may be realized at the same time, such that the situation of lagging caused by insufficient memory due to excessive write requests included in one request set is avoided.

In some other examples, the preset value may further be another numerical value, and may be set according to actual application requirements. The present disclosure is not limited thereto.

In some examples, the host further includes a driver layer, where the driver layer is configured to encapsulate each of the M request sets into a corresponding write command conforming to an interface protocol of the memory system.

The host may be coupled with various types of memory systems. Interface protocols of different memory systems are different. The interface protocol includes, but is not limited to, a USB protocol, an MMC protocol, a Peripheral Component Interconnect (PCI) protocol, a Peripheral Component Interconnect Express (PCI-E) protocol, an Advanced Technology Attachment (ATA) protocol, a serial ATA protocol, a parallel ATA protocol, a Small Computer System Interface (SCSI) protocol, an Enhanced Small Disk Interface (ESDI) protocol, an Integrated Drive Electronics (IDE) protocol, and a Firewire protocol, etc. By encapsulating each of the M request sets into one corresponding write command conforming to the interface protocol of the memory system, the corresponding memory system can correctly receive and perform the write command.

In some examples, the driver layer is configured to send the write command to the memory system to simultaneously perform a write operation on each reclaim group carried in the request set corresponding to the write command.

The driver layer is configured to send the encapsulated write command to the memory system. As shown in FIG. 6, in some examples, the write command 1 to the write command 4 may be sent to the memory system in sequence. That the memory system receives and performs the write command 1 is used as an example for description below. The write command 1 is obtained by encapsulating the request set 1 according to an encapsulation protocol, such that the write command 1 may still include 4 write requests in the request set 1. When the driver layer sends the write command 1 to the memory system, actually, 4 write requests are sent to the memory system at the same time, and the memory system may perform the write operation on the 4 write requests at the same time. Therefore, the degree of parallelism of IO of the memory system is improved, thereby improving working efficiency.

In some examples, the scheduler is configured to divide the N write requests into the M request sets in a user mode or a kernel mode.

In the examples of the present disclosure, the scheduler may be implemented in the user mode (which is similar to a Storage Performance Development Kit (SPDK)) or the kernel mode. The present disclosure is not limited thereto.

Examples of the present disclosure further provide an operation method of a host. The host is coupled with a memory system supporting a flexible data placement function; the memory system includes a memory device, and the memory device includes K dies; the K dies are divided into L reclaim groups, and each reclaim group includes at least one die; and K and L are positive integers greater than or equal to 2. As shown in FIG. 7, the method includes:

operation S1: receiving N write requests, where each write request carries corresponding reclaim group information, and N is a positive integer; and operation S2: placing the N write requests in M request sets, where write requests carrying the same reclaim group information are placed in different ones of the request sets, and M is a positive integer less than or equal to N.

The host provided by the examples of the present disclosure is coupled with the memory system supporting the flexible data placement function; the write request sent by the host at least carries corresponding reclaim group information; and the reclaim group information is used for indicating in which die the data related to the write command is written.

It is to be noted that, in the examples of the present disclosure, K dies are divided into at least two reclaim groups, that is to say, one reclaim group do not include all the K dies, this is because, when the reclaim group includes all the dies, and the number of write requests sent by the user layer exceeds one, die busy may be caused. However, at least one die may be included.

In the examples of the present disclosure, by adding the scheduler in the host, the scheduling and merging of the write requests from the user layer are realized, the N write requests are placed in the M request sets (N≤M). In some examples, if the reclaim group information correspondingly carried by the N write requests are all the same, the N write requests are placed in the M request sets, and in this case, N=M. In some examples, if at least two pieces of the reclaim group information correspondingly carried by the N write requests are different, the N write requests are placed in the M request sets, and in this case, N<M. It can be understood that, if at least two pieces of the reclaim group information correspondingly carried by the N write requests are different, in the examples of the present disclosure, the effect of improving the degree of parallelism of IO can be achieved by only placing at least two write requests carrying different reclaim group information in one request set. By means of the scheduler provided by the examples of the present disclosure, the write requests from the same reclaim group are prevented from being merged in the same request set.

In the examples of the present disclosure, since reclaim group information correspondingly carried by each write request in the same request set are all different, the plurality of dies required to be occupied by each write request in the same request set are not duplicated as well, thus not causing die busy. The SSD can simultaneously process the plurality of write requests, such that a degree of parallelism of IO is improved, and problems such as performance degradation caused by die busy are avoided.

In conclusion, in the examples of the present disclosure, when one reclaim group does not include all the K dies, the write requests corresponding to the same reclaim group are distributed in different ones of the request sets, and the reclaim group information of each write request in the same request set are all different, such that the control of the host over data can be guaranteed, and the degree of parallelism of IO can be improved.

In some examples, the N write requests constitute at least one request group, and the reclaim group informations carried by write requests in the same request group are the same. In some examples, write requests in the same request group carry the same reclaim group information. M is equal to the number of write requests in the request group with the largest number of write requests among the at least one request group.

In some examples, an absolute value of a difference value between the numbers of write requests included in any two of the M request sets is less than or equal to a preset value.

In some examples, the method further includes: encapsulating each of the M request sets into a corresponding write command conforming to an interface protocol of the memory system.

In some examples, the method further includes: sending the write command to the memory system to simultaneously perform a write operation on each reclaim group carried in the request set corresponding to the write command.

In some examples, a die includes a plurality of blocks, and the blocks in the reclaim group that are located in a same position of the at least one die constitute a reclaim unit; the memory system is configured with a mapping table, the mapping table is to record a mapping relationship between a reclaim unit handle, the reclaim group and the reclaim unit, and the reclaim unit handle is associated with one reclaim unit in each reclaim group; and each write request also carries corresponding reclaim unit handle information.

In some examples, the dividing the N write requests into the M request sets includes:

dividing the N write requests into the M request sets in a user mode or a kernel mode.

Examples of the present disclosure further provide a memory system. The memory system includes a memory device and a memory controller coupled with the memory device. The memory device includes K dies; the K dies are divided into L reclaim groups, and each reclaim group includes at least one die; and K and L are positive integers greater than or equal to 2. The memory controller is configured to:

receive M write commands, where each of the M write commands corresponds to one request set, each request set includes at least one write request, and each write request carrying same reclaim group information is included in a different request set; and M is a positive integer.

In the examples of the present disclosure, since each write command corresponds to one request set, each request set includes at least one write request, and the reclaim group information corresponding to each write request is different. Therefore, the plurality of dies required to be occupied by each write request in the same request set are not duplicated as well, thus not causing die busy. The SSD can simultaneously process at least one write request corresponding to the write command, such that the degree of parallelism of IO is improved.

In some examples, a die includes a plurality of blocks, and the blocks in the reclaim group that are located in a same position of the at least one die constitute a reclaim unit; the memory system is configured with a mapping table, the mapping table is to record a mapping relationship between a reclaim unit handle, the reclaim group and the reclaim unit, and the reclaim unit handle is associated with one reclaim unit in each reclaim group; and each write request also carries corresponding reclaim unit handle information. The memory controller is configured to:

based on the mapping table, determine each target reclaim unit in each reclaim group carried in the request set corresponding to the write command.

A write operation is simultaneously performed on each target reclaim unit in each reclaim group carried in the request set corresponding to the write command.

Refer to FIG. 2, the mapping table is to record the mapping relationship between the reclaim unit handle, the reclaim group and the reclaim unit. When the reclaim group information and the reclaim unit handle information are determined, the reclaim unit pointed to is also determined. In some examples, the write request includes the reclaim group information and the reclaim unit handle information, and the corresponding reclaim unit may be found by searching in the mapping table. The reclaim unit may be configured to store data related to the write command.

In the examples of the present disclosure, the data may be flexibly placed at different positions in the memory device through the mapping table, so as to effectively access and process the data.

In the examples of the present disclosure, after the M write commands are received, first, each target reclaim unit in each reclaim group carried in the request set corresponding to the write command may be determined through the mapping table.

Then, the write operation is performed on the write command, actually, the write operation is performed on each of the target reclaim units at the same time, such that the degree of parallelism of IO and write efficiency are improved.

Examples of the present disclosure further provide an operation method of a memory system. The memory system includes a memory device and a memory controller coupled with the memory device; the memory device includes K dies; the K dies are divided into L reclaim groups, and each reclaim group includes at least one die; and K and L are positive integers greater than or equal to 2. As shown in FIG. 8, the method includes:

operation S3: receiving M write commands, where each of the M write commands corresponds to one request set, each request set includes at least one write request, and each write request carrying same reclaim group information is included in a different request set; and M is a positive integer.

In the examples of the present disclosure, since each write command corresponds to one request set, each request set includes at least one write request, and the reclaim group information corresponding to each write request is different. Therefore, the plurality of dies required to be occupied by each write request in the same request set are not duplicated as well, thus not causing die busy. The SSD can simultaneously process at least one write request corresponding to the write command, such that the degree of parallelism of IO is improved.

In some examples, a die includes a plurality of blocks, and the blocks in the reclaim group that are located in a same position of the at least one die constitute a reclaim unit; the memory system is configured with a mapping table, the mapping table is to record a mapping relationship between a reclaim unit handle, the reclaim group and the reclaim unit, and the reclaim unit handle is associated with one reclaim unit in each reclaim group; and each write request also carries corresponding reclaim unit handle information. The method further includes:

based on the mapping table, determining each target reclaim unit in each reclaim group carried in the request set corresponding to the write command.

A write operation is simultaneously performed on each target reclaim unit in each reclaim group carried in the request set corresponding to the write command.

Examples of the present disclosure further provide an electronic apparatus. The electronic apparatus includes a host and a memory system coupled with the host, where the memory system includes a memory device and a memory controller coupled with the memory device; the memory device includes K dies; the K dies are divided into L reclaim groups, and each reclaim group includes at least one die; and K and L are positive integers greater than or equal to 2. The host includes a user layer, a scheduler, and a driver layer.

The user layer is configured to receive N write requests, where each write request carries corresponding reclaim group information, and N is a positive integer.

The scheduler is configured to place the N write requests in M request sets, where write requests carrying the same reclaim group information are placed in different ones of the request sets, and M is a positive integer less than or equal to N.

The driver layer is configured to encapsulate each of the M request sets into a corresponding write command conforming to an interface protocol of the memory system, and send the write command to the memory system to simultaneously perform a write operation on each reclaim group carried in the request set corresponding to the write command.

The memory controller is configured to receive the write command.

In the examples of the present disclosure, the electronic apparatus includes, but is not limited to, a personal computer, a digital camera, a mobile phone, a smart watch, smart home, etc.

Examples of the present disclosure further provide a computer-readable storage medium. The computer-readable storage medium stores instructions. The instructions, when being executed, can implement the method as described in any one of the above examples.

The computer-readable storage medium may include, but is not limited to, a Random Access Memory (RAM), a Read Only Memory (ROM), an Electrically Erasable Programmable Read Only Memory (EEPROM), a Static Random Access Memory (SRAM), a hard disk, etc.

The computer-readable storage medium further includes one or more of any suitable media for storing executable instructions of a computer program, such that an instruction execution machine, system, device, or device may read (extract) instructions from the computer-readable medium and perform the instructions for performing the method.

For the method in the above examples, the execution method has been described in detail in the examples related to products corresponding to the method, and details are not described herein again.

It is to be understood that "one example" and "an example" mentioned in the whole specification mean that features, structures or characteristics related to the example is included in at least one example of the present disclosure. Therefore, "in one example" or "in an example" appearing at any place of the whole specification does not always refer to the same example. In addition, these features, structures or characteristics may be combined in one or more examples in any proper manner. It is to be understood that, in various examples of the present disclosure, the sequence number of each process does not mean the sequence of execution. The execution sequence of each process should be determined by its functions and internal logic, which should not constitute any limitation on the implementation process of the examples of the present disclosure. The serial numbers of the foregoing examples of the present disclosure are merely for description, and do not represent the superiority or inferiority of the examples.

It is to be noted that terms "include" and "comprise" or any other variant thereof is intended to cover nonexclusive inclusions herein, so that a process, method, object or apparatus including a series of components not only includes those components but also includes other components which are not explicitly listed or further includes components intrinsic to the process, the method, the object or the apparatus. Under the condition of no more limitations, a component defined by the statement "including one . . . " does not exclude existence of the same other components in a process, method, object or apparatus including the component.

The above is only the implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims.

What is claimed is:

1. A host, coupled with a memory system supporting a flexible data placement function, wherein the memory system comprises a memory device, and the memory device comprises K dies; the K dies are divided into L reclaim groups, and each reclaim group comprises at least one die; K and L are positive integers greater than or equal to 2; the host comprises a user layer and a scheduler;

the user layer is configured to send N write requests, wherein each write request carries corresponding reclaim group information, and N is a positive integer; and the scheduler is configured to receive the N write requests, and place the N write requests in M request sets, wherein write requests carrying the same reclaim group information are placed in different ones of the request sets, and M is a positive integer less than or equal to N, wherein the N write requests constitute at least one request group, and write requests in same request group carry same reclaim group information; and M is equal to a number of write requests in the request group with the largest number of write requests among the at least one request group.

2. The host of claim 1, wherein an absolute value of a difference value between numbers of write requests comprised in any two of the M request sets is less than or equal to a preset value.

3. The host of claim 2, wherein the absolute value of the difference value between the numbers of write requests comprised in any two of the M request sets is less than or equal to 1.

4. The host of claim 1, further comprising a driver layer configured to encapsulate each of the M request sets into a corresponding write command conforming to an interface protocol of the memory system.

5. The host of claim 4, wherein the driver layer is configured to send the corresponding write command to the memory system to simultaneously perform a write operation on each reclaim group carried in the request set corresponding to the corresponding write command.

6. The host of claim 1, wherein a die comprises a plurality of blocks, and the blocks in the each reclaim group and with same number constitute a reclaim unit; and the memory system is configured with a mapping table, the mapping table records a mapping relationship between a reclaim unit handle, the L reclaim groups and the reclaim unit, and the reclaim unit handle is associated with one reclaim unit in the each reclaim group; and each write request also carries corresponding reclaim unit handle information.

7. The host of claim 1, wherein the scheduler is configured to divide the N write requests into the M request sets in a user mode or a kernel mode.

8. A method of operating a host, wherein the host is coupled with a memory system supporting a flexible data placement function; the memory system comprises a memory device, and the memory device comprises K dies; the K dies are divided into L reclaim groups, and each reclaim group comprises at least one die; K and L are positive integers greater than or equal to 2; and the method comprises:

receiving N write requests, wherein each write request carries corresponding reclaim group information, and N is a positive integer; and placing the N write requests in M request sets, wherein write requests carrying the same reclaim group information are placed in different ones of the request sets, and M is a positive integer less than or equal to N, wherein an absolute value of a difference value between numbers of write requests comprised in any two of the M request sets is less than or equal to a preset value.

9. The method of claim 8, wherein the N write requests constitute at least one request group, and write requests in same request group carry same reclaim group information; and M is equal to a number of write requests in the request group with the largest number of write requests among the at least one request group.

10. The method of claim 9, wherein the absolute value of the difference value between the numbers of write requests comprised in any two of the M request sets is less than or equal to 1.

11. The method of claim 8, further comprising: encapsulating each of the M request sets into a corresponding write command conforming to an interface protocol of the memory system.

12. The method of claim 11, further comprising: sending the corresponding write command to the memory system to simultaneously perform a write operation on each reclaim group carried in the request set corresponding to the corresponding write command.

13. The method of claim 8, wherein a die comprises a plurality of blocks, and the blocks in the each reclaim group and with same number constitute a reclaim unit; and the memory system is configured with a mapping table, the mapping table records a mapping relationship between a reclaim unit handle, the L reclaim groups and the reclaim unit, and the reclaim unit handle is associated with one reclaim unit in the each reclaim group; and each write request also carries corresponding reclaim unit handle information.

14. The method of claim 8, wherein the dividing the N write requests into the M request sets comprises:

dividing the N write requests into the M request sets in a user mode or a kernel mode.

15. A memory system, comprising:

a memory device comprising K dies, the K dies being divided into L reclaim groups, each reclaim group comprising at least one die, and K and L being positive integers greater than or equal to 2; and a memory controller coupled with the memory device and configured to:

receive M write commands, wherein each of the M write commands corresponds to one request set, each request set comprises at least one write request, and write requests carrying same reclaim group information are comprised in a different request set; and M is a positive integer, wherein an absolute value of a difference value between numbers of write requests comprised in any two of the M request sets is less than or equal to a preset value.

16. The memory system of claim 15, wherein a die comprises a plurality of blocks, and the blocks in the reclaim group that are located in a same position of the at least one die constitute a reclaim unit; the memory system is configured with a mapping table, the mapping table is to record a reclaim unit handle and a mapping relationship between the reclaim group and the reclaim unit, and the reclaim unit handle is associated with one reclaim unit in each reclaim group; each write request also carries corresponding reclaim unit handle information; and the memory controller is configured to:

based on the mapping table, determine each target reclaim unit in each reclaim group carried in the request set corresponding to a write command of the M write commands; and simultaneously perform a write operation on each target reclaim unit in each reclaim group carried in the request set corresponding to the write command of the M write commands.

17. The memory system of claim 15, wherein the memory system comprises solid state drives (SSD).

18. The memory system of claim 15, wherein the memory device comprises NAND flash memory.

* * * * *